(12) United States Patent
Yano et al.

(10) Patent No.: US 8,111,778 B2
(45) Date of Patent: Feb. 7, 2012

(54) METHOD FOR SUPPRESSING PEAK POWER OF ORTHOGONALLY MULTIPLEX SIGNAL, PEAK POWER SUPPRESSING CIRCUIT, AND TRANSMITTER

(75) Inventors: Takashi Yano, Tokorozawa (JP); Shigenori Hayase, Kodaira (JP); Masashi Naito, Hachioji (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 818 days.

(21) Appl. No.: 12/199,595

(22) Filed: Aug. 27, 2008

(65) Prior Publication Data

US 2009/0060073 A1 Mar. 5, 2009

(30) Foreign Application Priority Data

Aug. 29, 2007 (JP) ................................ 2007-222820

(51) Int. Cl.
*H04L 25/49* (2006.01)
(52) U.S. Cl. ........ 375/296; 375/260; 375/285; 455/501; 455/63.1; 455/67.11; 455/114.2; 455/115.1
(58) Field of Classification Search .................. 375/146, 375/260, 285, 296, 299; 455/501, 63.1, 67.11, 455/67.13, 101, 114.2, 115.1, 115.3; 370/203, 370/204, 208, 464, 465, 478, 484
See application file for complete search history.

(56) References Cited

U.S. PATENT DOCUMENTS

| | | | |
|---|---|---|---|
| 6,144,694 A | 11/2000 | Uta et al. | |
| 6,653,890 B2 | 11/2003 | Ono et al. | |
| 6,847,252 B1 | 1/2005 | Ono et al. | |
| 7,583,736 B2* | 9/2009 | Miyoshi et al. | 375/260 |
| 7,792,200 B2* | 9/2010 | Molander | 375/260 |
| 2002/0006169 A1* | 1/2002 | Hunton | 375/295 |
| 2002/0196863 A1* | 12/2002 | Kaku et al. | 375/285 |
| 2004/0218689 A1 | 11/2004 | Akhtman | |
| 2007/0047431 A1* | 3/2007 | Nishio et al. | 370/203 |
| 2007/0121738 A1 | 5/2007 | Yoshii et al. | |
| 2010/0172438 A1 | 7/2010 | Koyanagi et al. | |

FOREIGN PATENT DOCUMENTS

| | | |
|---|---|---|
| CN | 1849763 | 10/2006 |
| JP | 2003-124824 | 4/2003 |
| WO | 2007091434 A1 | 8/2007 |
| WO | 2009004862 A1 | 1/2009 |

OTHER PUBLICATIONS

U.S. Appl. No. 12/175,572, filed Jul. 18, 2008.

* cited by examiner

*Primary Examiner* — Dac Ha
(74) *Attorney, Agent, or Firm* — Brundidge & Stanger, P.C.

(57) ABSTRACT

To suppress the peak of the orthogonal multiplex transmission signal which is small in deterioration of the quality of the reception signal by generating the cancellation waveform in synchronization with the timing of the symbol of the transmission signal. There is provided a peak suppressing method that suppresses peaks of an orthogonally multiplexed signal whose orthogonality is ensured in given time units, the method comprising: a first step of detecting the peaks of the orthogonally multiplexed signal; a second step of generating a peak cancellation waveform based on the detected peaks of the orthogonally multiplexed signal; and a third step of removing the peak of the orthogonally multiplexed signal from the orthogonally multiplexed signal using the generated peak cancellation waveform. The second step comprises generating the peak cancellation waveform in said time units of the orthogonally multiplexed signal.

18 Claims, 13 Drawing Sheets

METHOD FOR SUPPRESSING PEAK POWER OF ORTHOGONALLY MULTIPLEX SIGNAL, PEAK POWER SUPPRESSING CIRCUIT, AND TRANSMITTER

CLAIM OF PRIORITY

The present application claims priority from Japanese patent application JP 2007-222820 filed on Aug. 29, 2007, the content of which is hereby incorporated by reference into this application.

FIELD OF THE INVENTION

This invention relates to a transmitting device for transmitting an orthogonally multiplexed signal, and more particularly, to a processing method of suppressing the peak of the orthogonally multiplexed signal.

BACKGROUND OF THE INVENTION

In a radio system such as a terrestrial digital television broadcasting, a wireless LAN, or IEEE802.16, there has been used an OFDM (orthogonal frequency division multiplex) signal. The OFDM signal is a signal in which symbols are transmitted in parallel by the aid of a plurality of carrier waves that are different in the center frequency from each other. Also, the signals are transmitted orthogonally to each other to prevent the bands of the adjacent carrier waves from interfering with each other. In general, there arises such a problem that the OFDM signal is larger in peak amplitude than an average signal level, that is, the RMS value (root-mean-square of signal amplitude) of the signal. The ratio of the peak amplitude to the RMS value is called "PAPR" (peak to average power ratio). A circuit that deals with a signal having a large PAPR is required to have a wide dynamic range. Accordingly, in particular, it is necessary to set the operating point of a radio amplifier at a final stage of the transmitting device to be low, as a result of which the power efficiency of the final radio amplifier is deteriorated. The same problem also arises in a communication device using a CDMA (code division multiple access). Therefore, there has been known a technique by which the maximum level of the signal amplitude is reduced before the radio signal is amplified.

JP 2003-124824 A discloses a technique in which the peak (signal portion having a large amplitude) of a transmission signal is detected, and a given signal waveform having the same band as that of a transmission signal spectrum is subtracted from the transmission signal according to the peak of the transmission signal, to thereby suppress the peak of the transmission signal.

Also, US 2004/0218689 discloses a technique in which the peak of a transmission signal which exceeds a given threshold value is detected, and a signal c[m] resulting from allowing a pulse signal train p[m] produced based on the detected peak to pass through a filter is subtracted from the transmission signal, to thereby suppress the peak of the transmission signal. US 2004/0218689 also discloses a technique in which the filter that inputs the pulse signal train p[m] is configured in such a manner that the frequency response and the impulse response of the filter are configured so that the frequency components of the signal band of the transmission signal spectrum and the frequency components outside the signal (frequency) band pass through the filter at a given ratio, and so that the signal c[m] that has passed through the filter includes the frequency components within the signal band and the frequency components outside the signal band.

SUMMARY OF THE INVENTION

The above-mentioned related art conducts a process of converting the transmission signal into a signal different from the signal to be originally transmitted. Hence, when a receiving device receives the signal, there arises such a problem that the quality of the signal is deteriorated as compared with a case in which a process of suppressing the peak of the transmission signal is not conducted. This invention has been made in view of the above circumstances, and it is therefore an object of this invention to suppress the peak of an orthogonally multiplexed signal (for example, OFDM signal) which is small in deterioration of the quality of the signal with respect to the results of processing the reception signal. The orthogonally multiplexed signal refers to a signal whose orthogonality is ensured in time units of symbols.

Also, in the case of suppressing the peak of the transmission signal, when the waveform (cancellation waveform) used for suppressing the peak is generated without synchronization with the timing of the symbol of the transmission signal, a waveform that is across the boundary between the symbols of the transmission signal is generated. In this event, when the receiving device clips the symbol of the reception signal, the quality of the reception signal is deteriorated in orthogonality because the cancellation waveform is divided. It is another object of this invention to suppress the peak of the orthogonally multiplexed transmission signal which is small in deterioration of the quality of the reception signal by generating the cancellation waveform in synchronization with the timing of the symbol of the transmission signal.

A representative aspect of this invention is as follows. That is, there is provided a peak suppressing method that suppresses a peak of an orthogonally multiplexed signal whose orthogonality is ensured in given time units, the method comprising: a first step of detecting the peak of the orthogonally multiplexed signal; a second step of generating a peak cancellation waveform based on the detected peaks of the orthogonally multiplexed signal; and a third step of removing the peaks of the orthogonally multiplexed signal from the orthogonally multiplexed signal using the generated peak cancellation waveform. The second step comprises generating the peak cancellation waveform in said time units of the orthogonally multiplexed signal.

According to an embodiment of this invention, as a result of suppressing the peak of the transmission signal, it is possible to reduce the deterioration of the quality of the reception signal that is processed in the receiving device.

Also, in the case of permitting the deterioration of the quality of the signal to the same degree as that in the related art, it is possible to more increase the suppression quantity of the peak of the transmission signal. Accordingly, the operating point of the radio frequency amplifier can be made higher, thereby making it possible to improve the power efficiency.

BRIEF DESCRIPTION OF THE DRAWINGS

The present invention can be appreciated by the description which follows in conjunction with the following figures, wherein.

DETAILED DESCRIPTION OF THE PREFERRED EMBODIMENTS

Hereinafter, a description will be given of embodiments of this invention with reference to the accompanying drawings.

First Embodiment

First, a transmitting device according to a first embodiment of this invention will be described.

Figure 1:
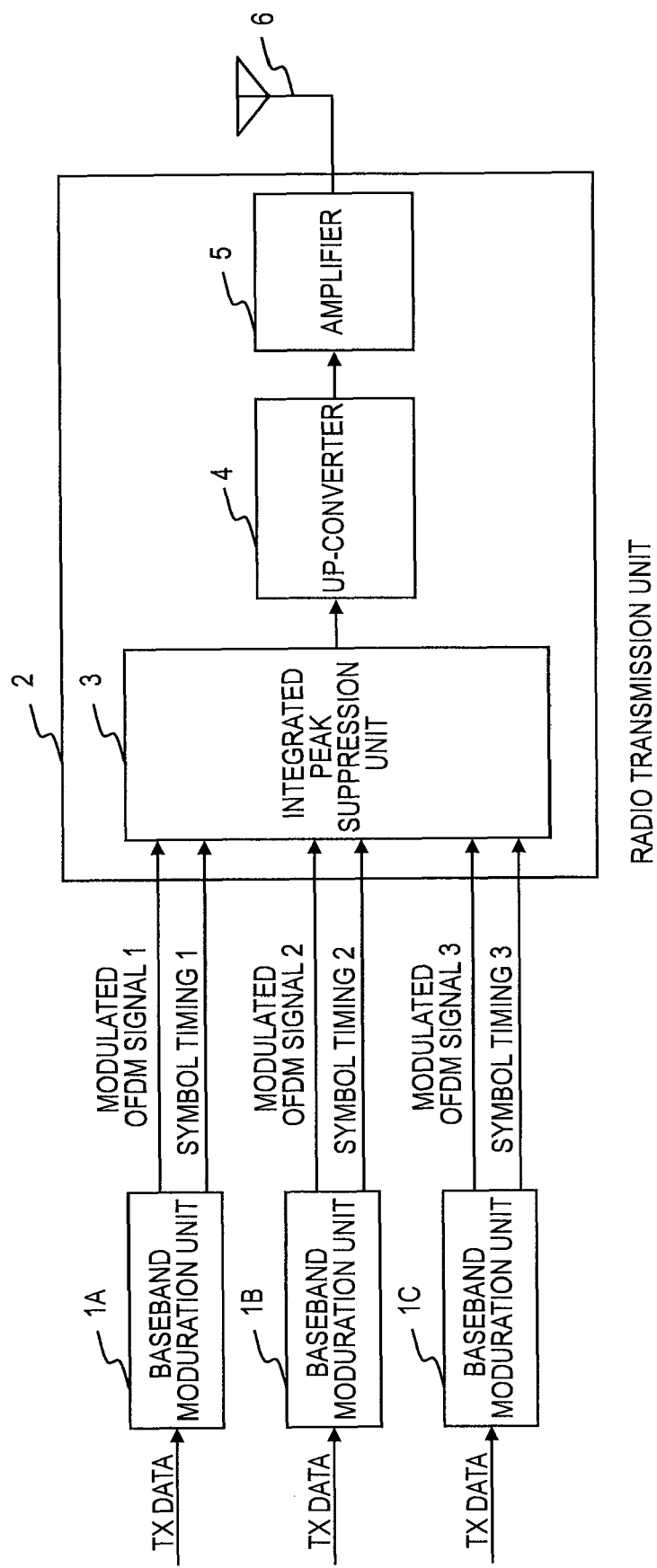
FIG. 1 is a block diagram showing a configuration of a transmitting device in accordance with a first embodiment of this invention.

FIG. 1 is a configuration diagram showing the transmitting device according to the first embodiment of this invention.

The transmitting device includes a baseband modulation unit 1 (1A, 1B, 1C) and a radio transmission unit 2.

The baseband modulation unit 1 modulates a signal of input transmission data by the aid of an OFDM system, and outputs the modulated signal as a modulated OFDM signal. Also, the baseband modulation unit 1 outputs a signal (symbol timing) that is synchronous with the timing of the symbol of the modulated OFDM signal. The output modulated OFDM signal and the symbol timing are input to an integrated peak suppression unit 3 of the radio transmission unit 2.

The radio transmission unit 2 includes the integrated peak suppression unit 3, an up-converter 4, an amplifier 5, and an antenna 6.

The integrated peak suppression unit 3 synthesizes the input modulated OFDM signal and the input symbol timing together, and suppresses the peak of the synthesized signal (OFDM signal). The suppressed OFDM signal is input to the up-converter 4.

The up-converter 4 up-converts the OFDM signal into a radio transmission frequency, and inputs the radio transmission frequency to the amplifier 5.

The amplifier 5 amplifies the electric power of the OFDM signal up to a desired transmission power.

The amplified OFDM signal is transmitted from the antenna 6 as a transmission signal.

The transmitting device shown in FIG. 1 is made up of three baseband modulation units. Alternatively, the transmitting device can be made up of one baseband modulation unit. Also, the transmitting device can be made up of a plurality of baseband modulation units other than three.

Figure 2:
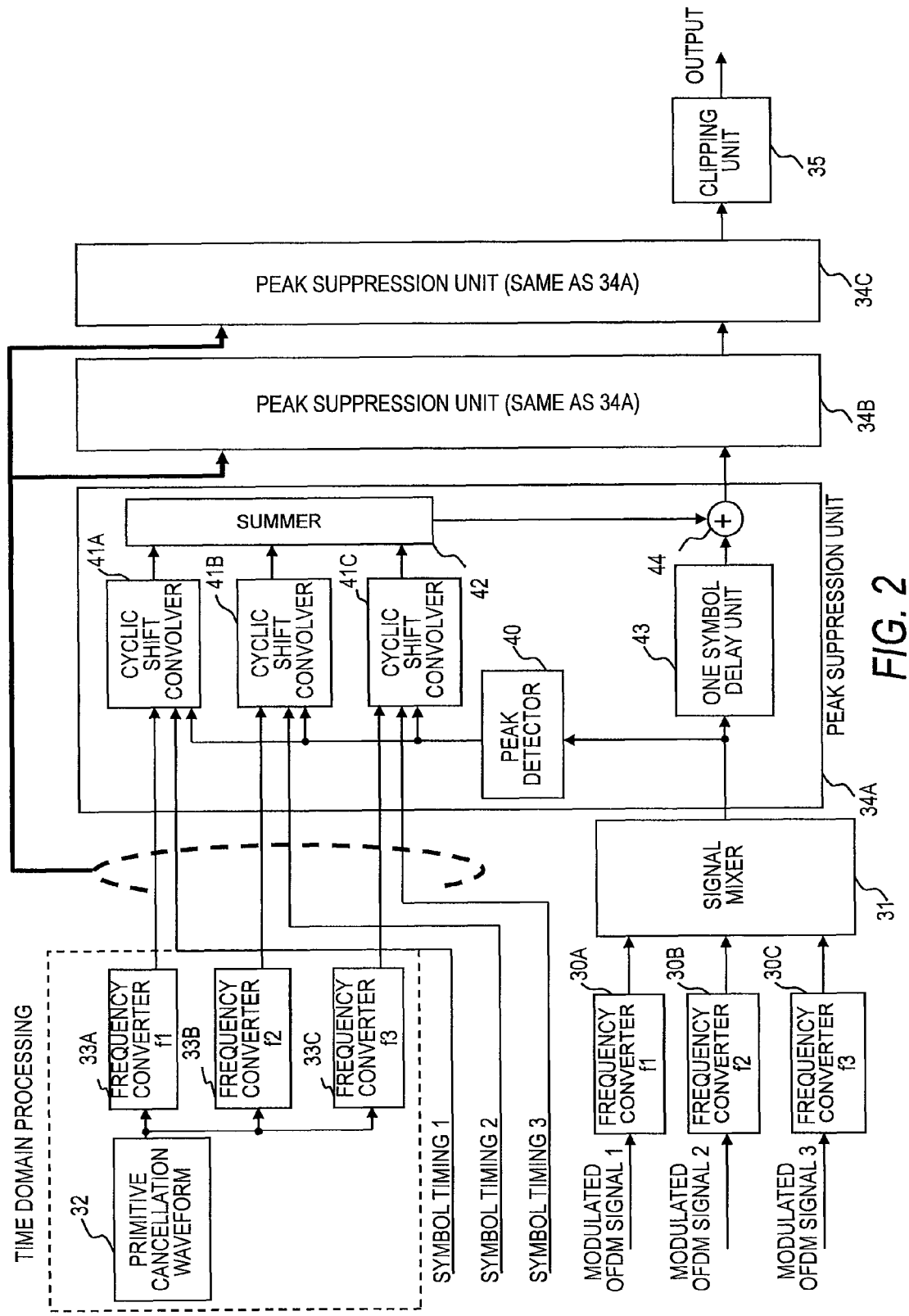
FIG. 2 is a block diagram showing a configuration of an integrated peak suppression unit in accordance with the first embodiment of this invention.

FIG. 2 is a configuration diagram showing the integrated peak suppression unit 3 according to the first embodiment of this invention.

The integrated peak suppression unit 3 includes a frequency converter 30 (30A, 30B, 30C), a signal mixer 31, a primitive cancellation waveform holding unit 32, a frequency converter 33 (33A, 33B, 33C), a peak suppression unit 34 (34A, 34B, 34C), and a clipping unit 35.

The frequency converter 30 converts the respective input modulated OFDM signals into frequencies (f1 to f3) corresponding to the transmission frequencies. The converted modulated OFDM signals are input to the signal mixer 31.

The signal mixer 31 mixes the input modulated OFDM signals together, and inputs the mixed signal (OFDM signal) to the peak suppression unit 34.

The primitive cancellation waveform holding unit 32 output the primitive waveform for cancellation in a time domain which is used to suppress the peak of the OFDM signal. The outputted primitive waveform is input to the frequency converter 33. The primitive waveform that is outputted form the cancellation waveform holding unit 32 is a waveform that does not affect the OFDM signal or hardly affects the OFDM signal in demodulation process at the receiving side.

The frequency converter 33 converts the primitive waveform into the frequencies (f1 to f3) corresponding to the frequencies of the modulated OFDM signal to be transmitted. The converted primitive waveforms are input to the peak suppression unit 34.

The peak suppression unit 34 includes a peak detector 40, a cyclic shift convolver 41, a summer 42, a one symbol delay unit 43, and an adder 44.

The peak detector 40 detects the peaks included in the OFDM signal. The peak detector 40 inputs information on the position, amplitude, and phase of the detected peaks to the cyclic shift convolver 41.

The cyclic shift convolver 41 generates the cancellation waveform of the symbol unit based on the symbol timing and the information on the peaks of the OFDM signal, and inputs the generated cancellation waveform to the summer 42. The details of the cyclic shift convolver 41 will be described later with reference to FIG. 5.

The summer 42 adds the cancellation waveforms of the symbol unit together, and synthesizes the cancellation waveforms including all of the frequency components of f1 to f3 together. When the cancellation waveforms of the frequency components f1 to f3 are mixed together, because the cancellation waveforms of the respective frequency components at the peak position of the OFDM signal are identical in phase with each other, the cancellation waveforms can be merely added together by the gain of ⅓ (1/n when n frequency components are mixed together) of the amplitude level, respectively. Also, when the transmission powers of the modulated OFDM signals including the respective frequency components are different from each other, the cancellation waveform may be mixed together at a ratio corresponding to the ratio of the transmission power, and at a ratio where the gain of the amplitude level of the total cancellation waveform becomes 1.

The one symbol delay unit 43 delays the OFDM signal by one symbol.

The adder 44 subtracts the cancellation waveform mixed by the summer 42 from the OFDM signal that is delayed by one symbol. The OFDM signal from which the cancellation waveform has been subtracted is output from the peak suppression unit 34. The output OFDM signal is input to the clipping unit 35.

The peaks that could not be completely suppressed by the first peak suppression unit 34 and peaks that have been newly generated by the side-effect of the peak suppressing process are suppressed step by step by repeatedly executing the process of suppressing the peaks. For example, after the process of suppressing the peaks has been executed by the peak suppression unit 34A, the process of further suppressing the peaks is repeated by the peak suppression unit 34B and the peak suppression unit 34C.

The clipping unit 35 executes a saturation operation (clipping) on the parts of the OFDM signal which exceeds given amplitude. More particularly, the clipping unit 35 removes the parts of the signal which exceeds the given amplitude. The OFDM signal on which the clipping process has been executed is output from the peak suppression unit 34.

The generated cancellation waveform is transmitted from the antenna 6 as an error component of the transmission signal. Accordingly, the cancellation waveform is configured by the spectrum shown in FIG. 3 which has the spectral power densities that are permitted in the each frequency bands of the modulated OFDM signals.

Figure 3:
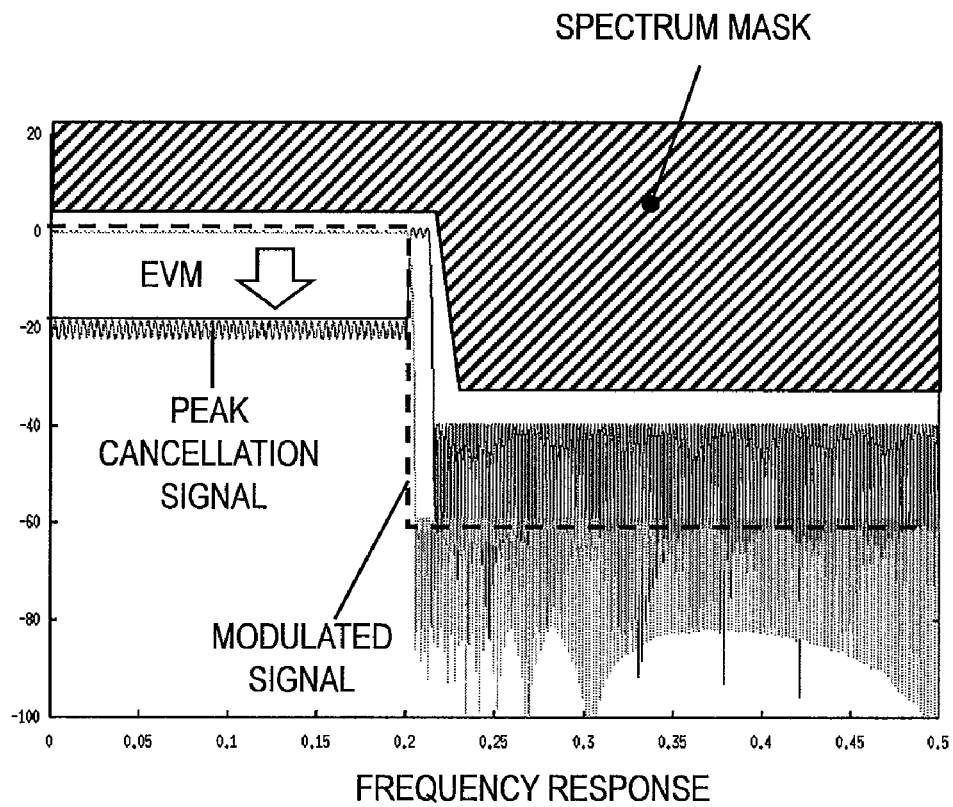
FIG. 3 is a wave form diagram showing a spectrum of a cancellation waveform for peak suppressing in accordance with the first embodiment of this invention.

A broken line of FIG. 3 indicates the spectrum of the transmission signal. A shaded area indicates a spectrum mask that must be satisfied by the transmission signal. The peak cancellation signal (cancellation waveform) is set to have a power density that satisfies a given EVM (error vector magnitude) within the signal band, have a high power spectrum density in a gap between the spectrum of the transmission signal which exists in the frequency band and the spectrum mask, and have a low power density in a band outside the frequency band. The phases of the signals of the respective frequencies are set to be identical in phase at the timing of the peak.

For example, when a peak is located at the head (time is 0) of the symbol of the OFDM signal, the phases of the signals of all the frequencies need to be identical with each other. Also, when a peak is located at the center of the symbol of the OFDM signal, the phases of the signals of the adjacent frequencies are different from each other by 180 degrees. The cancellation waveform thus designed has a waveform shown in FIG. 4 in the time domain. In other words, the cancellation waveform becomes a waveform obtained by synthesizing the damped oscillation over a relatively long period of time which is caused by the components of the gap between the spectrum of the transmission signal and the spectrum mask (i.e. band edge components) and the center peak waveform which is caused by the frequency components within the signal band together.

When the symbol timings of the modulated OFDM signals of the respective frequency bands (f1 to f3) are identical with each other, the processing of the summer 42 shown in FIG. 2 can be executed before the cyclic shift convolver 41, thereby making it possible to constitute the cyclic shift convolver of the peak suppression unit 34 by one element. Also, the processing of the summer 42 is not executed by the respective peak suppression units 34, but can be shared. As a result, the results of the processing of the cancellation waveform holding unit 32, the frequency converter 33, and the summer 42 can be commonly held as the cancellation waveform.

As described above, the cancellation waveform is an error signal with respect to the transmission signal. For that reason, when the cancellation waveform include the frequency component within the signal band, the quality of the signal is deteriorated. Accordingly, when only the components outside the signal band are included in the cancellation waveform, the quality of the signal is not fundamentally deteriorated. However, when the cancellation waveform is constituted by only the components of the band edge, a distinctive peak is not included in the cancellation waveform, and the damped oscillations occur over the relatively long period of time. This waveform makes it difficult to effectively suppress the peak.

If the center peak is used to suppress the peaks, a large number of peaks are generated by side-effect at locations where no peaks exist before peak suppression due to a large number of peaks having substantially the same levels which are included in the cancellation waveform. As a result, it is necessary to execute more peak suppressing processes.

On the other hand, the cancellation waveform that is constituted by the entire signal band includes a sharp peak, and is suitable for the peak suppressing process. However, the error components within the signal band mean that the quality of the signal is directly deteriorated. When a large peak suppression level is ensured, it is difficult to realize the large suppression level, because the deterioration of the signal is large.

Figure 4:
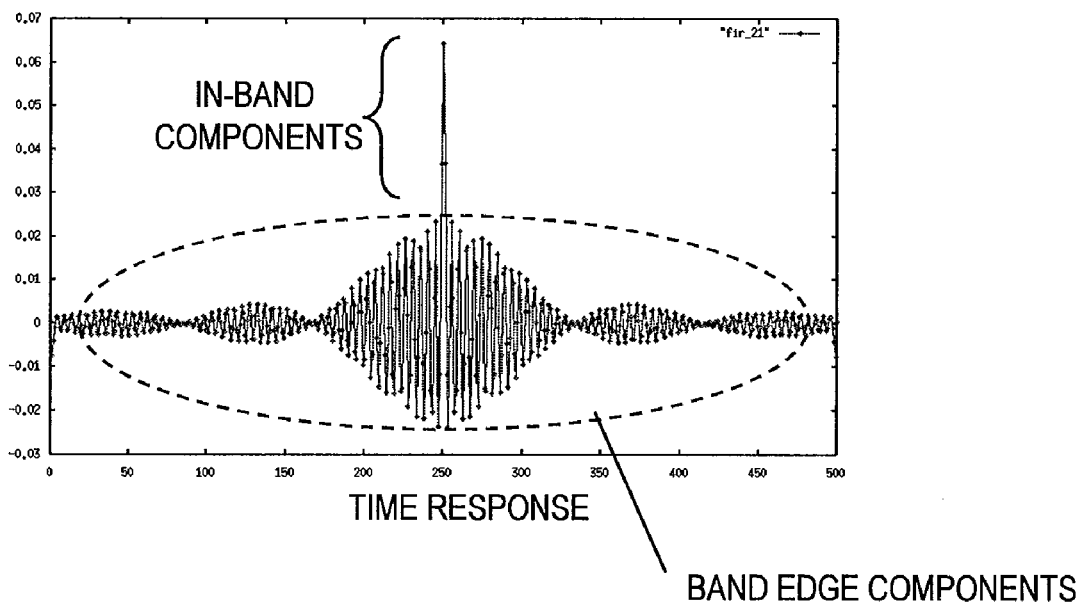
FIG. 4 is a wave form diagram showing, in time domain, a spectrum of a cancellation waveform for peak suppressing in accordance with the first embodiment of this invention.

The cancellation waveforms shown in FIGS. 3 and 4 constitute the high cancellation waveform, in which both of the components within the frequency band and outside the frequency band cooperate with each other in a balanced manner. As a result, the peaks can be effectively suppressed while the error within the signal band is suppressed to a low value.

Figure 12A:
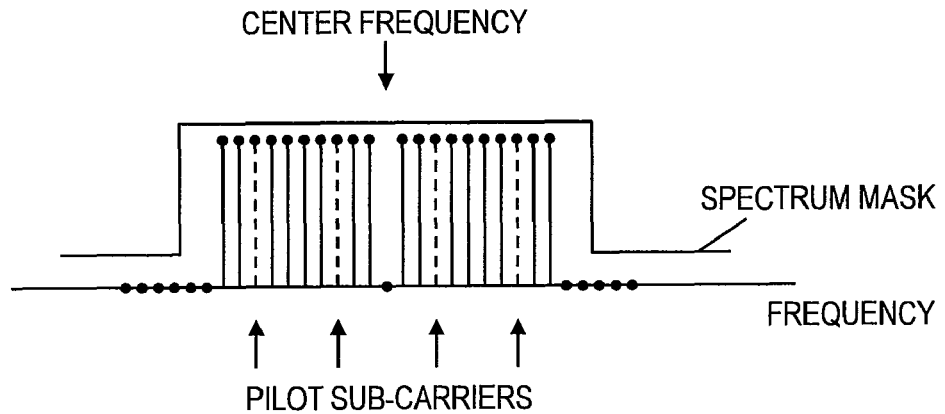
FIG. 12 is a wave form diagram showing an example of a spectrum of an OFDM signal and the cancellation waveform for peak suppressing in accordance with the first embodiment of this invention.
Figure 12B:
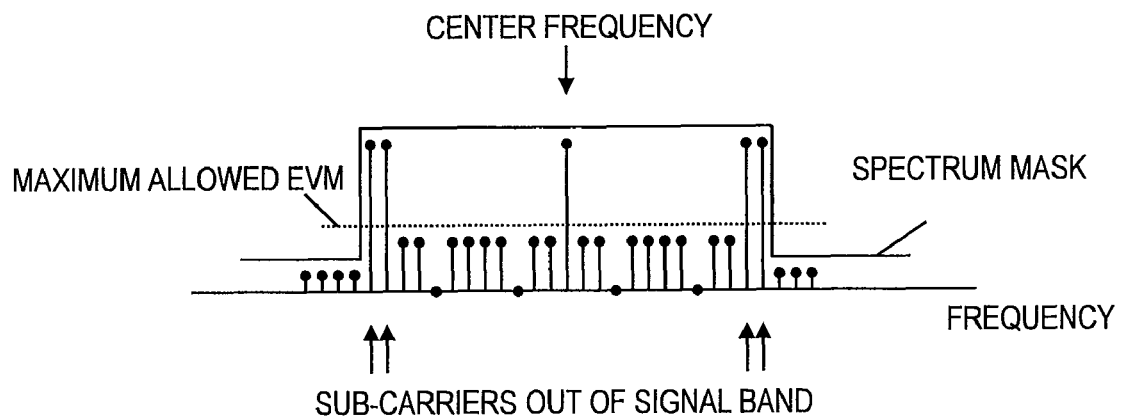
Figure 13A:
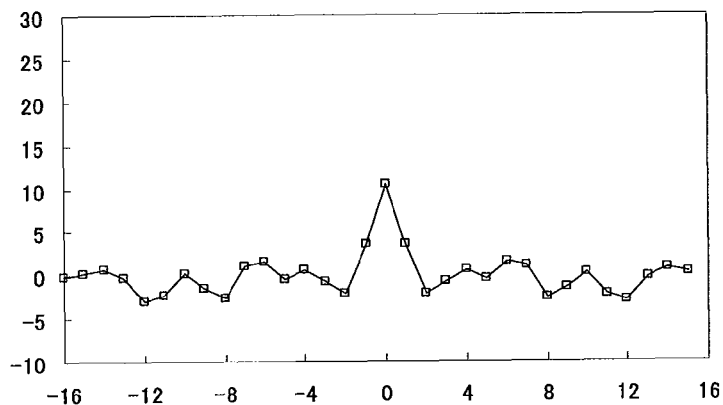
FIG. 13 is a wave form diagram showing, in time domain, an example of a spectrum of a cancellation waveform for peak suppressing in accordance with the first embodiment of this invention.
Figure 13B:
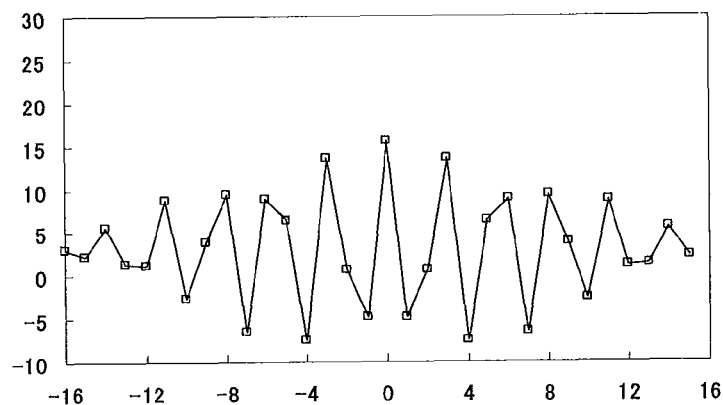
Figure 13C:
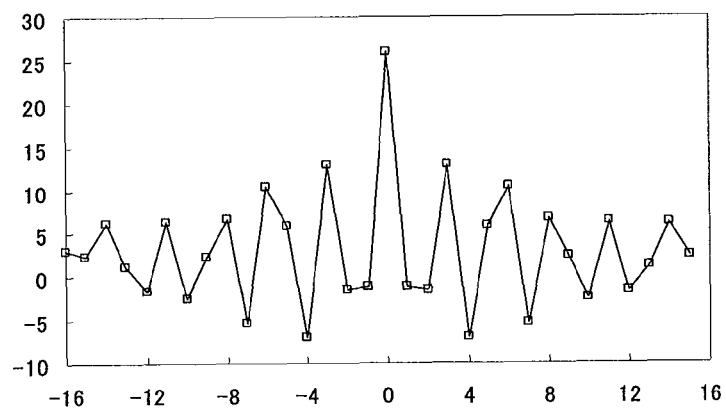

The peak cancellation waveform that is effectively applied to this invention will be described in more detail with reference to FIGS. 12A to 15C. For example, a system having a OFDM transmission signal of a spectrum structure and a spectrum mask shown in FIG. 12A are assumed. In other words, among 32 sub-carriers, 11 sub-carriers that are positioned at both ends and one sub-carrier that is positioned at the center frequency are not used, and the remaining 20 sub-carriers are used. Four of used 20 sub-carriers are pilot sub-carriers that are used as reference signals when demodulation is conducted by a receiver. In this case, the primitive cancellation waveform can be configured, for example, as shown in FIG. 12B. In other words, in the 20 sub-carriers in which the transmission signals are arranged, the signal error level (EVM) due to the cancellation waveform is set to be equal to or lower than a permissible value. Also, in the sub-carriers in which the transmission signals are not arranged, the respective frequency components of the cancellation waveforms are so set as to satisfy the spectrum mask. In the design of the above cancellation waveform, the cancellation waveform that is caused by only the sub-carriers in which the transmission signals are arranged is shown in FIG. 13A. The relatively distinctive peak is obtained in the center, but the level of the peak is not too large because of the restriction that the EVM is set to be equal to or lower than the permissible value. On the other hand, in the cancellation waveform that is caused by only the sub-carriers in which the transmission signals are not arranged, a plurality of peaks having substantially the same level exist as shown in FIG. 13B. The peak power is dispersed whereas the electric power can be set to be large because of the frequency components that do not affect the signal. As a result, the peak larger than that shown in FIG. 13A is obtained. The cancellation waveform having the spectrum shown in FIG. 12B which includes both of those frequency components has the peak of the distinctively large level in the center as shown in FIG. 13C, and is capable of effectively canceling the peak of the transmission signal. Because the sub-carrier in which the pilot signal is arranged is a reference signal in demodulation, it is desirable that the power level of the cancellation waveform be set to be lower than that of other sub-carriers to reduce the influence on the receiving characteristics.

Figure 14A:
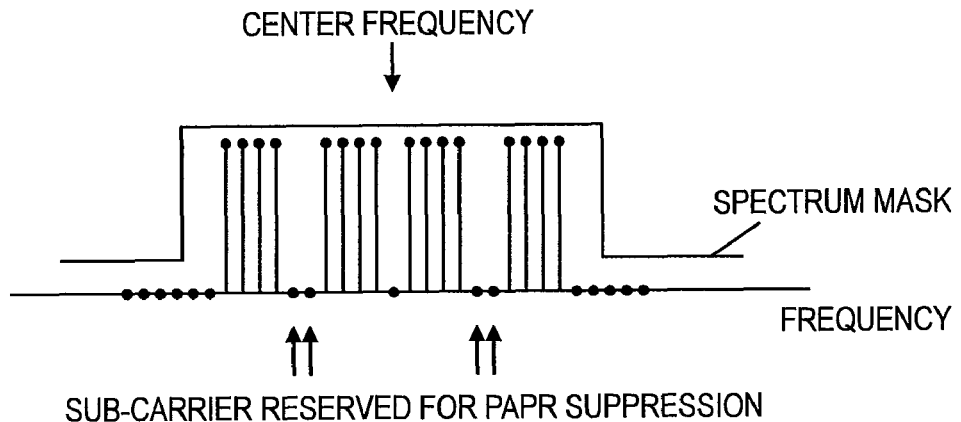
FIG. 14 is a wave form diagram showing another example of a spectrum of an OFDM signal and the cancellation waveform for peak suppressing in accordance with the first embodiment of this invention.
Figure 14B:
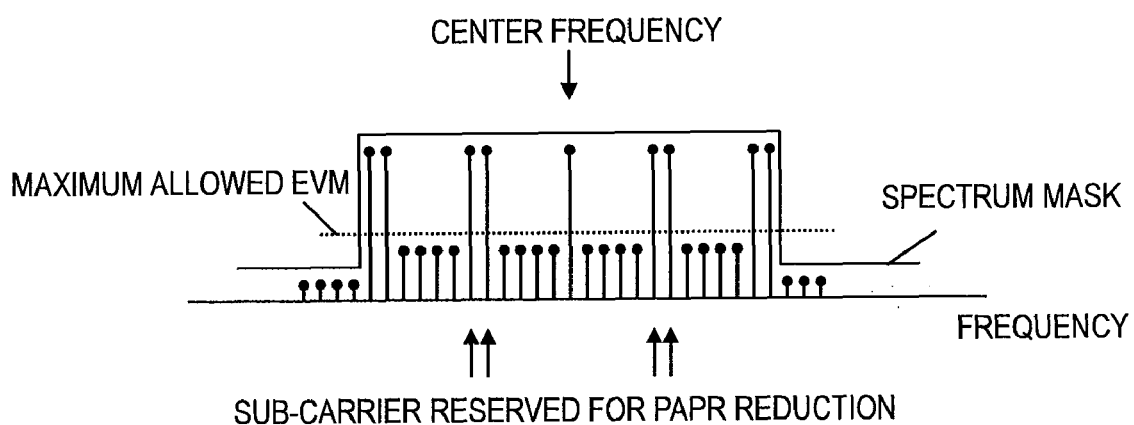
Figure 15A:
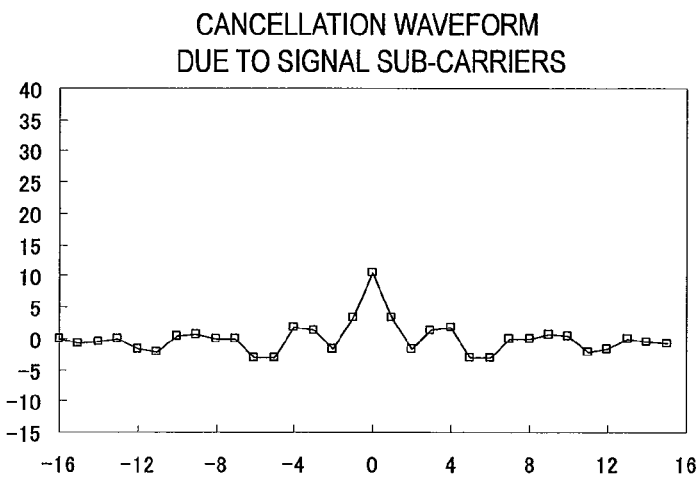
FIG. 15 is a wave form diagram showing, in time domain, another example of a spectrum of a cancellation waveform for peak suppressing in accordance with the first embodiment of this invention.
Figure 15B:
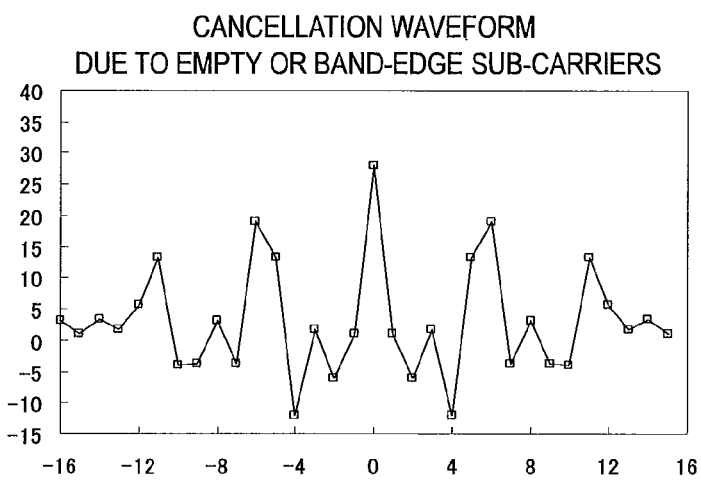
Figure 15C:
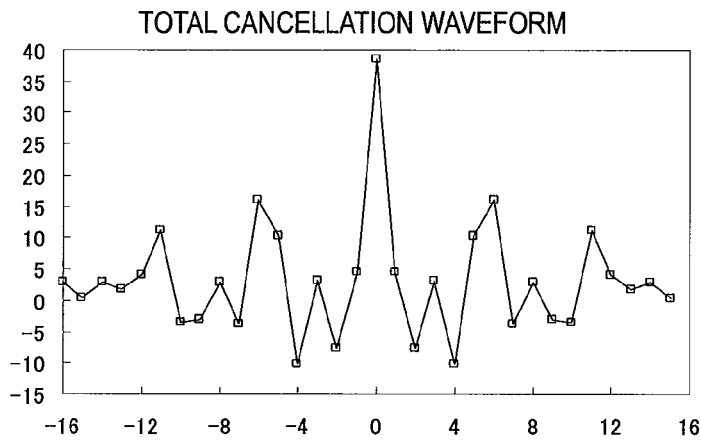

Further, as another example, a system having a spectrum structure of the OFDM transmission signal and a spectrum mask shown in FIG. 14A is assumed. In other words, among 32 sub-carriers, 11 sub-carriers that are positioned at both ends and one sub-carrier that is positioned at the center frequency are not used. In addition, it is determined that four sub-carriers among the remaining 20 sub-carriers are arranged for suppressing the PAPR. In this case, it is preferable that the sub-carriers for reduction of the PAPR not be generated by the baseband modulation unit 1, but the peak cancellation waveforms be generated in a lump by the integrated peak suppression unit 3 as shown in FIG. 14B. With the above arrangement, even in the radio transmission unit that transmits the OFDM signals of the plurality of frequency bands in a lump as shown in FIG. 1, the peak generated by mixing the OFDM signals of the plurality of frequency bands can be more effectively suppressed because all of the frequency components which can be used for canceling the peak can be adjusted at the same time. The cancellation waveform that is caused by only the sub-carriers in which the transmission signals are arranged, the cancellation waveform that is caused by only the sub-carriers in which the transmission signals are not arranged, and the cancellation waveform that is constituted by both of those frequency components are shown in FIGS. 15A, 15B, and 15C, and have the same tendencies as those of FIGS. 13A, 13B, and 13C.

As described above, the primitive cancellation waveform is generally required to be a waveform having one distinctive peak within the orthogonal time unit of the transmission signal, and a waveform that is small in influence of the orthogonal transmission signal. Accordingly, it is effective that a small electric power is allocated to the orthogonal components in which the transmission signals are arranged to reduce the influence on the signal, and allocate an electric power of the permissible maximum level to the orthogonal components in which the transmission signals are not arranged to form a high peak. On the other hand, the generation of the cancellation waveform is conducted in orthogonal time units that are processing units of the reception signal so that a large electric power that is allocated to the orthogonal component in which the transmission signals are not arranged does not affect the signal by losing the orthogonality during the processing of the reception signal.

Figure 5:
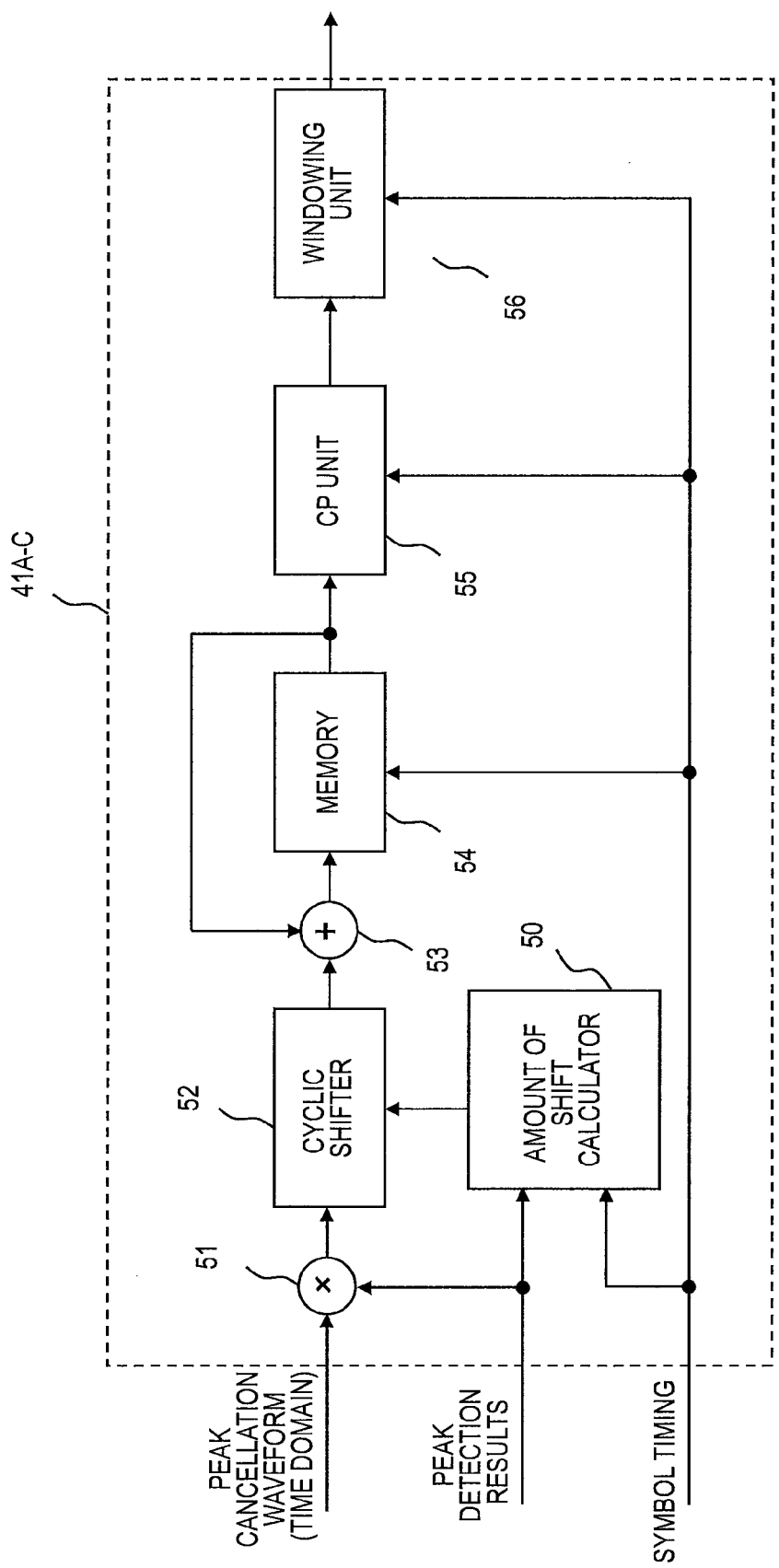
FIG. 5 is a block diagram showing a configuration of a cyclic shift convolver in accordance with the first embodiment of this invention.

FIG. 5 is a configuration diagram showing the cyclic shift convolver 41 according to the first embodiment of this invention.

The cyclic shift convolver 41 includes an amount-of-shift calculator 50, a complex multiplier 51, a cyclic shifter 52, an adder 53, a memory 54, a CP unit 55, and a symbol window processing unit 56.

The amount of shift calculator 50 estimates the cancellation waveform based on information on the peaks that have been detected by the peak detector 40 and the symbol timings, and calculates time shift amounts. The time shift amount is a period of time which is required to conform the timing of the cancellation waveform to each of the detected peaks.

The complex multiplier 51 adjusts the amplitudes and phases of the cancellation waveform so as to coincide with the amplitudes and phases of the detected peaks.

Figure 6:
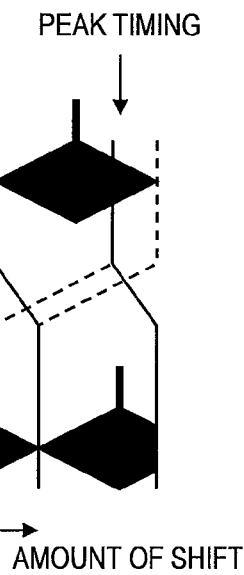
FIG. 6 is an explanatory diagram showing an example of an operation of the cyclic shift of the cancellation waveform in accordance with the first embodiment of this invention.

The cyclic shifter 52 executes the cyclic shift process on the cancellation waveform based on the calculated time shift amounts. The cyclic shift process shifts the time with signals before and after the symbol of the OFDM signal as continuous repetitive signals. More specifically, as shown in FIG. 6, a portion that gets out of the symbol time of the OFDM signal is connected to an opposite side as a result of shifting the cancellation waveform.

The adder 53 adds the cancellation waveform on which the cyclic shift process has been executed and the cancellation waveform that is stored in the memory together. The memory 54 stores the results of the cancellation waveforms that have been added by the adder 53. The stored cancellation waveforms are input to the adder 53 and the CP unit 55.

Figure 7:
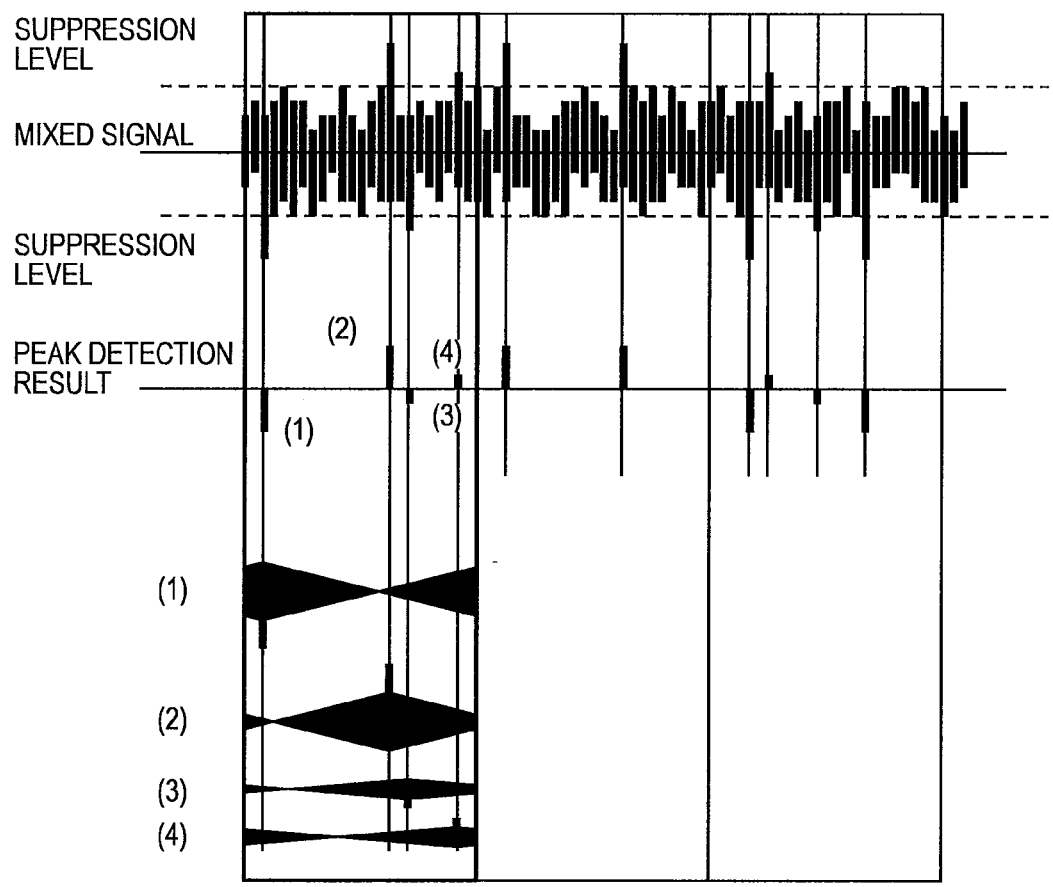
FIG. 7 is an explanatory diagram showing an example of the operation of the cyclic shift process in accordance with the first embodiment of this invention.

FIG. 7 shows the operation example of the cyclic shift process according to the first embodiment of this invention.

The uppermost waveform shown in FIG. 7 is a synthesis signal (OFDM signal) of the modulated OFDM signal. Dotted lines indicate levels that require the suppression of the signals. Further, the middle waveform indicates peaks (peak detection outputs) that exceed a desired suppression level in the first symbol of the OFDM signal. Further, the lowermost waveforms are waveforms resulting from conducting the cyclic shift process on the cancellation waveform that is generated with respect to the peaks which have been detected by the first symbol. For example, the waveform (1) of the lowermost waves is a signal whose amplitude and phase are adjusted with respect to the peak of the peak detection output (1), and which is subjected to the cyclic shift process in accordance with the timing. Four signals that have been subjected to the cyclic shift process in correspondence with the peak detection outputs (1) to (4) are added together by the adder 53 and the memory 54 into a cancellation waveform having the symbol length of the OFDM signal.

Figure 8:
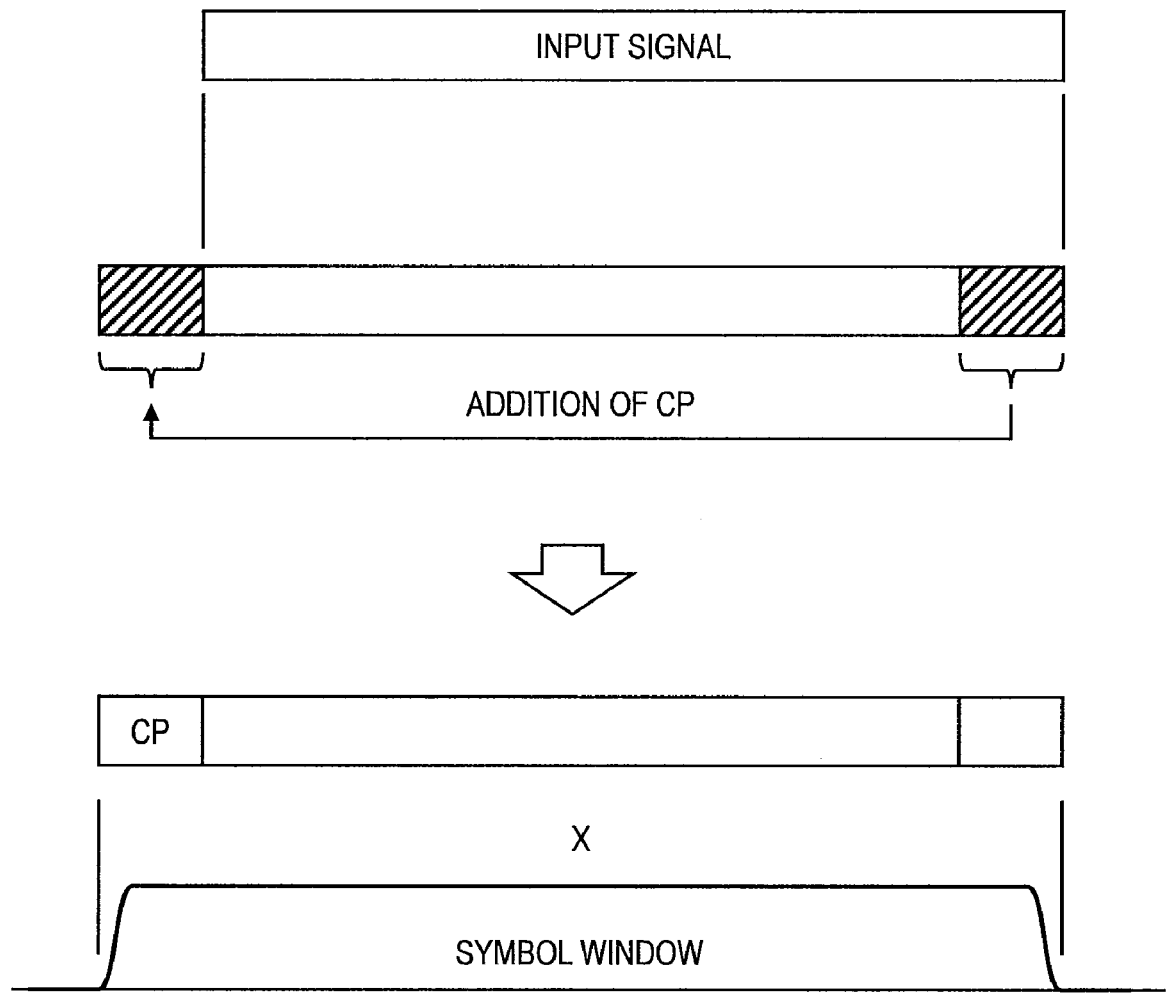
FIG. 8 is an explanatory diagram showing an example of the operation executed by a CP unit and a symbol window processing unit in accordance with the first embodiment of this invention.

The CP unit 55 adds a cyclic prefix (CP) to the cancellation waveform that has been stored in the memory. More specifically, as shown in FIG. 8, the CP unit 55 copies the last given length portion (CP) of the cancellation waveform, and adds the copied portion to the head of the cancellation waveform in the symbol time of the OFDM signal.

The symbol window processing unit 56 adjusts the levels of both ends of the symbol (symbol window process). More specifically, as shown in FIG. 8, the symbol window processing unit 56 multiplies the cancellation waveform by a gain (symbol window) that allows the gain of the amplitudes of the front and back portions of the cancellation waveform including the CP to be gradually attenuated, and smoothly connect to the adjacent symbols in the symbol time of the OFDM signal.

The addition of the CP and the symbol window process are identical with the general process of generating the transmission signal of the OFDM.

In the first embodiment of this invention, the cancellation waveform that is used to suppress the peak of the OFDM signal is generated in symbol units in synchronization with the symbol timing of the modulated OFDM signal. Accordingly, in the case where a fast Fourier transform (FFT: fast Fourier transform) is executed when the OFDM signal is demodulated in the receiving device, the cancellation waveform is not divided when a process of clipping the symbol of the OFDM signal is executed.

On the other hand, when the cancellation waveform is generated without synchronization with the symbol timing of the modulated OFDM signal, there is the possibility that the cancellation waveform is across the boundary between the symbols of the OFDM signal. In particular, in the case of using the cancellation waveform including the damped oscillation over a relatively long time period as shown in FIG. 4, the cancellation waveform becomes a waveform that is across the symbols of the plurality of OFDM signals.

When the receiving device executes the process of clipping the symbol of the OFDM signal with respect to the above signal, the cancellation waveform is divided to produce a spectrum that is different from the original spectrum of the cancellation waveform. As a result, the cancellation waveform having the spectrum shown in FIG. 3 deteriorates the quality of the reception signal because the frequency components of the high power densities which exist in a gap between the signal band and the spectrum mask that normally does not adversely affect the signal band change in a manner that includes the frequency components within the signal band.

Further, because there is used the cancellation waveform that coincides with the timing when the process of clipping the symbol of the OFDM signal is executed at the receiving side, the frequency components outside the signal band among the frequency components that are included in the cancellation waveform are capable of holding the orthogonality with respect to the signals within the signal frequency band. Besides, it is possible to conduct the peak suppressing process without deterioration of the receiving characteristics and with a reduction in the deterioration of the quality of the signal.

Second Embodiment

In the above first embodiment, the symbol timing of the modulated OFDM signal is input to the radio transmission unit 2 from the baseband modulation unit 1. On the other hand, in a second embodiment, a symbol timing detector 7 that is equipped in the radio transmission unit 2 inputs the symbol timing to the integrated peak suppression unit 3.

Figure 9:
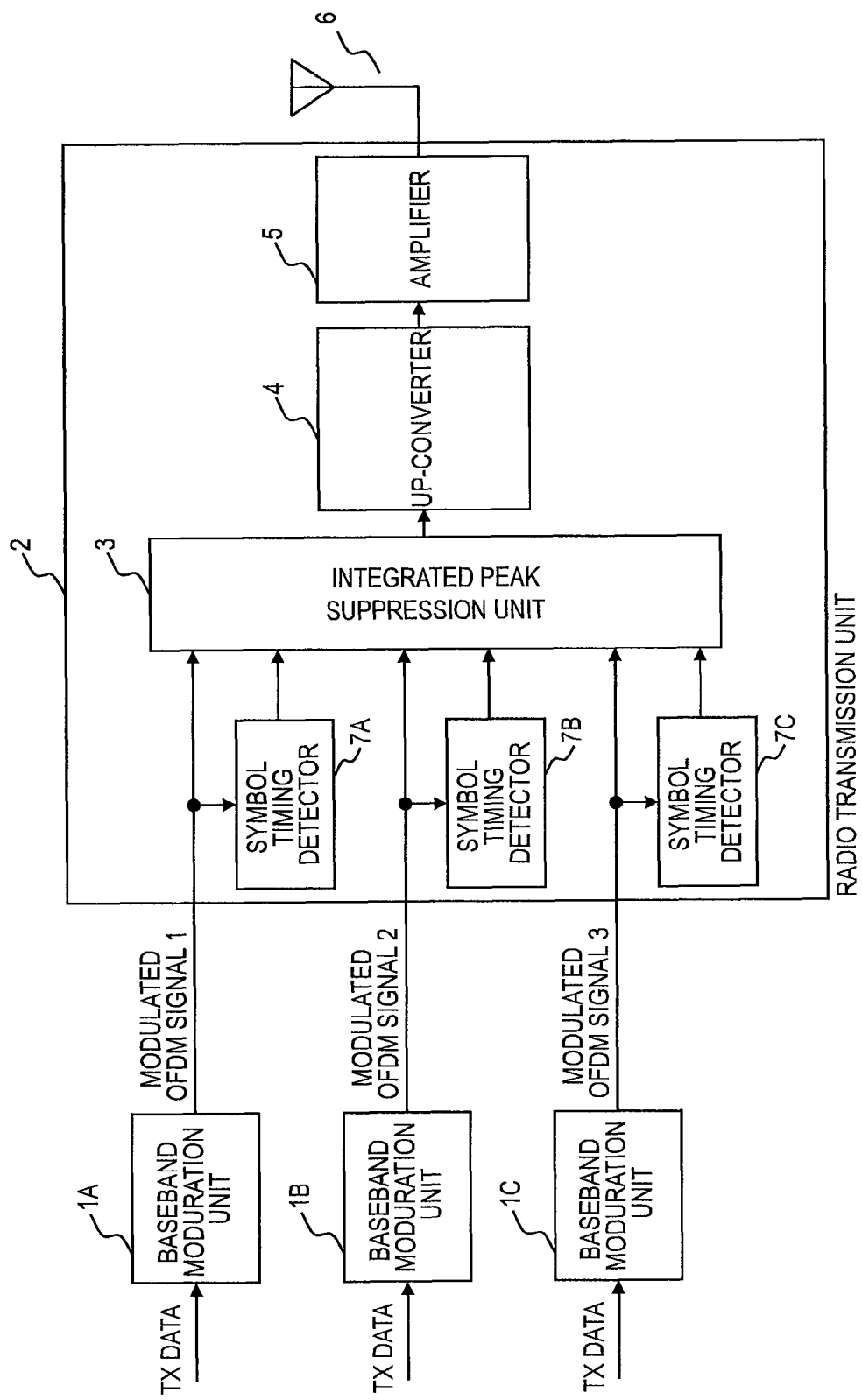
FIG. 9 is a block diagram showing a configuration of a transmitting device in accordance with a second embodiment of this invention.

FIG. 9 is a configuration diagram showing a transmitting device according to the second embodiment of this invention.

The radio transmission unit 2 is different from that of the first embodiment of this invention in that there is provided the symbol timing detector 7 (7A, 7B, 7C).

The symbol timing detector 7 detects the symbol timing from the modulated OFDM signal that has been input from the baseband modulation unit 1, and inputs the detected symbol timing to the integrated peak suppression unit 3. A method of detecting the symbol timing can be identical with the method of detecting the symbol timing of the OFDM signal by the receiving device. More specifically, the symbol timing detector 7 detects the timing of the signal by using the known signals (for example, pilot signals) that are arranged at given portions as marks.

Other configurations of the transmitting device are identical with those in the first embodiment of this invention, and therefore their description will be omitted.

Third Embodiment

In the above first embodiment, the cancellation waveform is processed in the waveform of the time domain. In a third embodiment of this invention, the cancellation waveform is processed in the waveform of the frequency domain.

Figure 10:
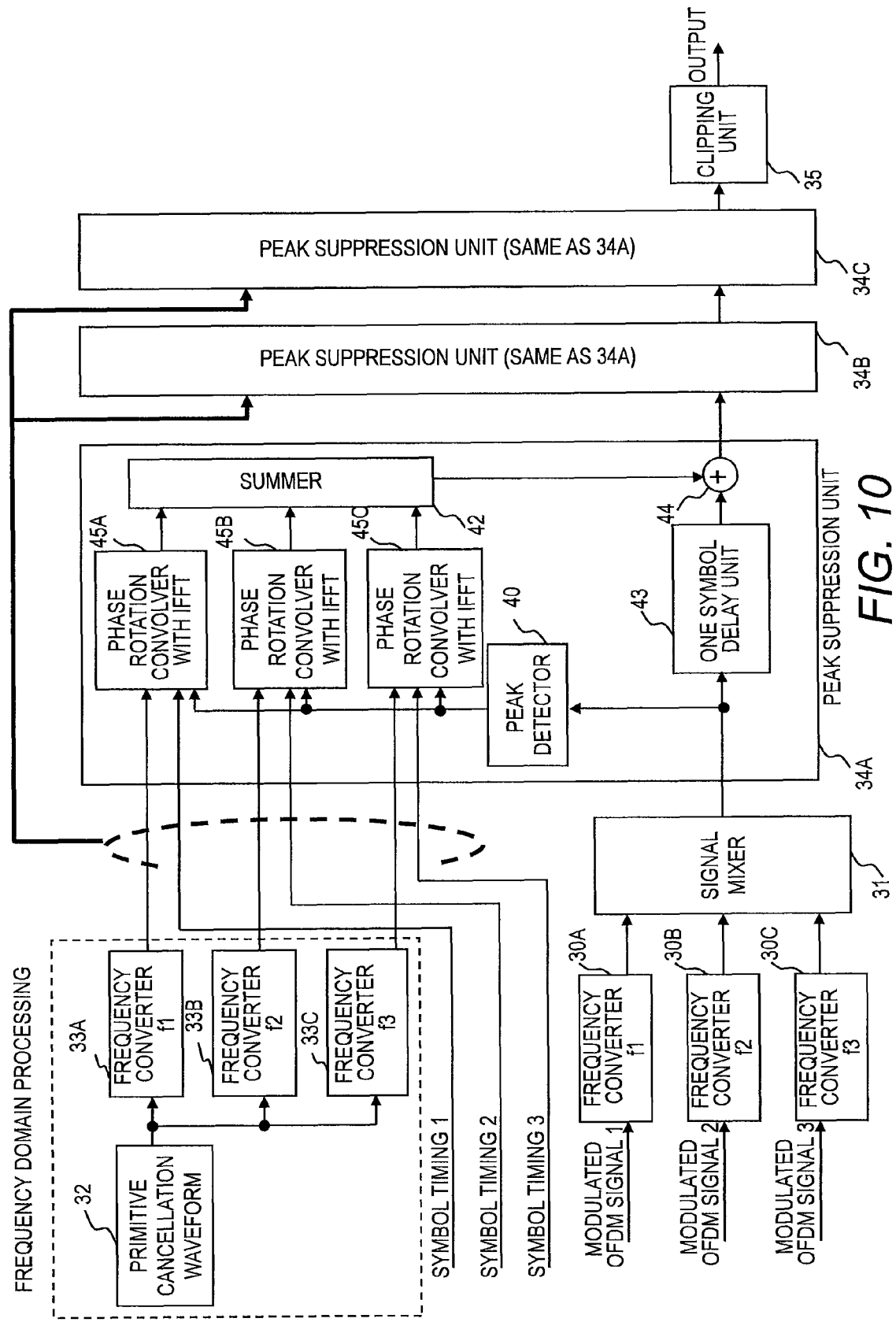
FIG. 10 is a block diagram showing a configuration of an integrated peak suppression unit in accordance with a third embodiment of this invention.

FIG. 10 is a configuration diagram showing an integrated peak suppression unit 3 according to the third embodiment of this invention.

The integrated peak suppression unit 3 is different from that of the first embodiment of this invention in that a phase rotation convolver with IFFT 45 is provided instead of the cyclic shift convolver 41.

The cancellation waveform that is generated in the third embodiment of this invention is a signal of a frequency domain having the same spectrum and waveform as that of FIG. 3 according to the first embodiment of this invention. In other words, the cancellation waveform according to the third embodiment of this invention and the cancellation waveform that is generated in the first embodiment of this invention have the relationship of a fast Fourier transform and an inversion fast Fourier transform (IFFT: inversion fast Fourier transform).

Also, the frequency converter 33 processes the generated cancellation waveform in the frequency domain.

The phase rotation convolver with IFFT 45 synthesizes the cancellation waveforms corresponding to all of the peaks that are included within the symbols of the modulated OFDM signals in the frequency domain, and outputs the cancellation waveform of the time domain by the inversion fast Fourier transform (IFFT).

Other configurations of the integrated peak suppression unit 3 are identical with those of FIG. 2 showing the first embodiment of this invention, and therefore their description will be omitted.

When the symbol timings of the modulated OFDM signals of the respective frequency bands (f1 to f3) are identical with each other, the processing of the summer 42 of FIG. 10 is executed before the phase rotation convolver with IFFT 45, thereby making it possible to constitute the phase rotation convolver with IFFT 45 of the peak suppression unit 34 by one piece. Also, the processing of the summer 42 is not executed by the respective peak suppression units 34, but can be shared. As a result, the results of the processing of the cancellation waveform holding unit 32, the frequency converter 33, and the summer 42 can be commonly held as the cancellation waveform.

Figure 11:
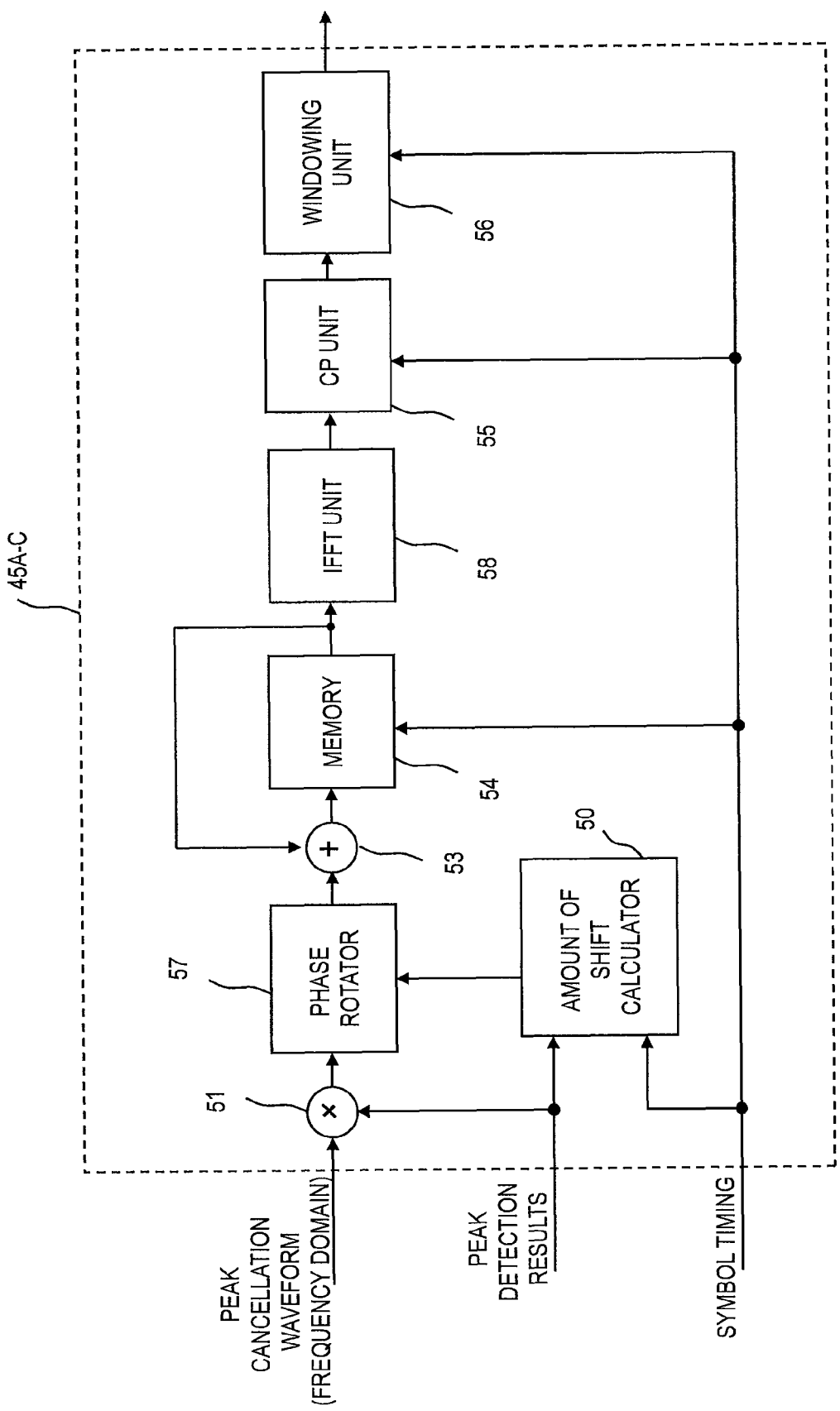
FIG. 11 is a block diagram showing a configuration of a phase rotation convolver with IFFT in accordance with the third embodiment of this invention.

FIG. 11 is a configuration diagram showing the phase rotation convolver with IFFT 45 according to the third embodiment of this invention.

The phase rotation convolver with IFFT 45 replaces the processing of the cyclic shift convolver 41 of FIG. 5 showing the first embodiment of this invention by the processing of the frequency domain. In other words, the process of shifting the time corresponds to the calculation for rotating the phase in the frequency domain.

The phase rotation convolver with IFFT 45 includes an amount of shift calculator 50, a complex multiplier 51, a phase rotator 57, an adder 53, a memory 54, an IFFT unit 58, a CP unit 55, and a symbol window processing unit 56.

The amount shift calculator 50, the complex multiplier 51, the adder 53, the memory 54, the CP unit 55, and the symbol window processing unit 56 are identical in the configuration with those of FIG. 5 showing the first embodiment of this invention, and therefore their description will be omitted.

The phase rotator 57 complexly multiplies $\exp(-j2\pi \cdot f \cdot t0)$ to the cancellation waveform when the time shift amount is t0, and the frequency of the frequency component that rotates the phase is f.

The IFFT unit 58 subjects the cancellation waveform that has been stored in the memory to inversion fast Fourier transform, and converts the cancellation waveform into the waveform of the time domain.

According to the third embodiment of this invention, the peak of the modulated OFDM signal can be effectively suppressed by using the cancellation waveform including both of the frequency components within the signal band and outside the signal band even when the error power within the signal band is small. Also, the process of generating the cancellation waveform is executed in symbol units in synchronization with the timing of the OFDM signal to be transmitted. This makes it possible that, when the reception signal is processed, the error frequency component that is added outside the signal band does not affect the signal within the signal band. As a result, there can be realized the peak suppressing process that performs both of the high peak suppression capability and the high signal quality.

Also, the process of rotating the phase does not need to complexly multiply a part of the frequency components of the spectrum of the cancellation waveform in which the power is zero. In other words, since the complex multiplication needs to be executed in only the part of the spectrum of the cancellation waveform, the complex multiplication other than the spectrum within the symbol can be omitted. Accordingly, when a large number of detected peaks exist, the number of parts of the spectrum which can be omitted from calculation increases, thereby making it possible to reduce the calculation amount.

In the first and the third embodiment of this invention, the peak suppressing units 34A, 34B and 34C in FIGS. 2 and 10 include the one-symbol delay processing unit 43 for executing a peak suppressing process by an OFDM of the symbol unit. The process delays of each stage are accumulated because peak suppressing units 34A, 34B and 34C are in multi-stage connection. Therefore, in a case where the process delay becomes a problem, it is preferable to have a configuration to reduce the process delay.

For example, if each process of the peak suppressing units 34A, 34B and 34C is processed at a higher clock speed than the clock speed corresponding to the original sampling rate of the transmission signal, the delay time is theoretically much shortened. This configuration brings another effect that the device size can be reduced because the plural peak suppressing units 34A, 34B and 34C are used integrally and time-shared. Moreover, it is also preferable to have a configuration in which, when modulated OFDM signals are input from the baseband modulation units 1A, 1B and 1C, the signals are input by burst (intermittently) transmission at a higher clock speed than the clock speed corresponding to the actual signal time, and therefore, the time required for inputting the signals is shortened.

Furthermore, it is also preferable to have a configuration to achieve low delay by parallelization of the processing. For example, in each of the peak suppressing units 34A, 34B and 34C, plural or all peaks are processed in parallel. For that, the plural complex multipliers 51, the plural amount-of-shift calculators 50, the plural cyclic shifters 52 and the plural phase rotators 57 are provided in the cyclic shift convolvers 41A, 41B and 41C in FIG. 2 and the phase rotation convolvers with IFFT 45A, 45B and 45C in FIG. 10. The plural peaks which are detected in the peak detector 40 are then processed in parallel and the adder 53 may synthesize a cancellation waveform obtained in parallel by addition. As an extreme example, in order to process an OFDM of one symbol in parallel, input and output signals of the each processing unit are parallelized. Accordingly, the process delays in the peak suppressing units 34A, 34B and 34C are minimized to one clock. Furthermore, it is also possible to make the process delay extremely short if an increase in the size of the device is allowed.

While the present invention has been described in detail and pictorially in the accompanying drawings, the present invention is not limited to such detail but covers various obvious modifications and equivalent arrangements, which fall within the purview of the appended claims.

What is claimed is:

1. A method for suppressing peak power of an orthogonally multiplexed signal whose orthogonality is ensured in given time units, the method comprising:
    a first step of detecting the peaks of the orthogonally multiplexed signal;
    a second step of generating a peak cancellation waveform based on the detected peaks of the orthogonally multiplexed signal; and
    a third step of removing the peaks of the orthogonally multiplexed signal from the orthogonally multiplexed signal using the generated peak cancellation waveform, wherein
    the second step comprises generating the peak cancellation waveform in said time units of the orthogonally multiplexed signal.

2. The method according to claim 1, wherein the second step comprises the steps of:
    calculating a shift amount by which a peak of a primitive waveform of the peak cancellation waveform having one peak within the time unit of the orthogonally multiplexed signal coincides with each of the detected peaks of the orthogonally multiplexed signal; and
    generating the peak cancellation waveform by cyclically shifting the primitive peak cancellation waveform within the time unit based on the calculated shift amount.

3. The method according to claim 2, wherein the second step comprises:
    adding a cyclic prefix to the cyclically shifted peak cancellation waveform; and
    generating the peak cancellation waveform by attenuating amplitudes of both ends of the peak cancellation waveform that is added with the cyclic prefix.

4. The method according to claim 1, wherein the second step comprises:
    calculating a shift amount by which a peak of the peak cancellation waveform coincides with each of the detected peaks of the orthogonally multiplexed signal;
    changing phases of respective frequency components of the peak cancellation waveform based on the calculated shift amount; and
    generating the peak cancellation waveform by subjecting the respective frequency components of the peak cancellation waveform whose phases are changed to inversion fast fourier transform.

5. The method according to claim 1, wherein:
    the orthogonally multiplexed signal is an OFDM signal; and
    the peak cancellation waveform includes a frequency component within a signal band of the OFDM signal and a frequency component outside the signal band.

6. The method according to claim 1, wherein the orthogonally multiplexed signal is obtained by synthesizing orthogonally multiplexed modulated signals in a plurality of frequency bands.

7. A peak power suppressing circuit that suppresses peaks of an orthogonally multiplexed signal whose orthogonality is ensured by a given time unit, comprising:

a detection unit for detecting the peaks of the orthogonally multiplexed signal;

a synthesis unit for generating a peak cancellation waveform based on the detected peaks of the orthogonally multiplexed signal; and a removal unit for removing the peaks of the orthogonally multiplexed signal from the orthogonally multiplexed signal using the generated peak cancellation waveform, wherein the synthesis unit generates the peak cancellation waveform in said time units of the orthogonally multiplexed signal.

8. The peak power suppressing circuit according to claim 7, wherein the synthesis unit comprises:

a shift amount calculator for calculating a shift amount by which a peak of a primitive waveform of the peak cancellation waveform having one peak within the time unit of the orthogonally multiplexed signal coincides with each of the detected peaks of the orthogonally multiplexed signal; and a cyclic shift unit for cyclically shifting the primitive peak cancellation waveform within the time unit based on the calculated shift amount.

9. The peak power suppressing circuit according to claim 8, wherein the synthesis unit comprises:

a CP unit for adding a cyclic prefix to the cyclically shifted peak cancellation waveform; and a symbol window processing unit for attenuating amplitudes of both ends of the peak cancellation waveform that is added with the cyclic prefix.

10. The peak power suppressing circuit according to claim 7, wherein the synthesis unit comprises:

a shift amount calculator for calculating a shift amount by which a peak of the peak cancellation waveform coincides with each of the detected peaks of the orthogonally multiplexed signal;

a phase rotator for changing phases of respective frequency components of the peak cancellation waveform based on the calculated shift amount; and an IFFT unit for subjecting the respective frequency components of the peak cancellation waveform whose phases are changed to inversion fast fourier transform.

11. The peak power suppressing circuit according to claim 7, wherein:

the orthogonally multiplexed signal is an OFDM signal; and the peak cancellation waveform includes a frequency component within a signal band of the OFDM signal and a frequency component outside the signal band.

12. The peak power suppressing circuit according to claim 7, wherein the orthogonally multiplexed signal is obtained by synthesizing orthogonally multiplexed modulation signals in a plurality of frequency bands.

13. A transmitter, comprising:

a baseband modulation unit for modulating data to be transmitted into an orthogonally multiplexed modulation signal whose orthogonality is ensured in given time units;

a peak suppression unit for synthesizing the orthogonally multiplexed modulation signal to an orthogonally multiplexed signal to suppress peaks of the orthogonally multiplexed signal;

a frequency converter for converting the suppressed orthogonally multiplexed signal into a radio transmission frequency; and an amplifier for amplifying an electric power of the orthogonally multiplexed signal that has been converted into the radio transmission frequency, wherein:

the peak suppression unit comprises:

a detection unit for detecting the peaks of the orthogonally multiplexed signal;

a synthesis unit for generating a peak cancellation waveform based on the detected peaks of the orthogonally multiplexed signal; and a removal unit for removing the peaks of the orthogonally multiplexed signal from the orthogonally multiplexed signal using the generated peak cancellation waveform; and the synthesis unit generates the peak cancellation waveform in said time units of the orthogonally multiplexed signal.

14. The transmitter according to claim 13, wherein the synthesis unit comprises:

a shift amount calculator for calculating a shift amount by which a peak of a primitive waveform of the peak cancellation waveform having one peak within the time unit of the orthogonally multiplexed signal coincides with each of the detected peaks of the orthogonally multiplexed signal; and a cyclic shift unit for cyclically shifting the primitive peak cancellation waveform within the time unit based on the calculated shift amount.

15. The transmitter according to claim 13, wherein the synthesis unit comprises:

a shift amount calculator for calculating a shift amount by which a peak of the peak cancellation waveform coincides with each of the detected peaks of the orthogonally multiplexed signal;

a phase rotator for changing phases of respective frequency components of the peak cancellation waveform based on the calculated shift amount; and an IFFT unit for subjecting the respective frequency components of the peak cancellation waveform whose phases are changed to inversion fast fourier transform.

16. The transmitter according to claim 13, wherein the synthesis unit comprises:

a CP unit for adding a cyclic prefix to the cyclically shifted peak cancellation waveform; and a symbol window processing unit for attenuating amplitudes of both ends of the peak cancellation waveform that is added with the cyclic prefix.

17. The transmitter according to claim 13, wherein:

the orthogonally multiplexed signal is an OFDM signal; and the peak cancellation waveform includes a frequency component within a signal band of the OFDM signal and a frequency component outside the signal band.

18. The transmitter according to claim 13, wherein the orthogonally multiplexed signal is obtained by synthesizing orthogonally multiplexed modulation signals in a plurality of frequency bands.

* * * * *